(12) United States Patent
Liang et al.

(10) Patent No.: US 8,007,576 B2
(45) Date of Patent: Aug. 30, 2011

(54) CHROME-FREE CORROSION INHIBITOR COMPOSITION

(75) Inventors: Jyh-Rong Liang, Taipei (TW); Po-Ya Hsu, Fongshan (TW); Ming-Chuan Wang, Sinshih Township (TW); Chia-Chih Ou, Kaohsiung (TW); Wen-Chieh Lin, Tainan (TW); I-Lin Cheng, Kaohsiung (TW)

(73) Assignee: Ya Thai Chemical Co., Ltd. (TH)

( * ) Notice: Subject to any disclaimer, the term of this patent is extended or adjusted under 35 U.S.C. 154(b) by 597 days.

(21) Appl. No.: 12/125,537

(22) Filed: May 22, 2008

(65) Prior Publication Data

US 2009/0139429 A1 Jun. 4, 2009

(30) Foreign Application Priority Data

Dec. 3, 2007 (TW) ................................ 96145901 A

(51) Int. Cl.
| | |
|---|---|
| C09D 5/08 | (2006.01) |
| C09D 105/00 | (2006.01) |
| C23C 22/53 | (2006.01) |
| C23C 22/56 | (2006.01) |
| C23F 11/00 | (2006.01) |
| C23F 11/04 | (2006.01) |
| B05D 3/02 | (2006.01) |

(52) U.S. Cl. ............... 106/14.44; 106/14.11; 106/14.21; 106/14.41; 106/14.42; 106/14.43; 427/384; 428/457; 428/472

(58) Field of Classification Search ............... 106/14.11, 106/14.21, 14.41, 14.42, 14.43, 14.44; 427/384; 428/457, 472
See application file for complete search history.

(56) References Cited

U.S. PATENT DOCUMENTS

| | | | | | |
|---|---|---|---|---|---|
| 5,380,374 | A | * | 1/1995 | Tomlinson | 148/247 |
| 5,432,456 | A | * | 7/1995 | Kelley | 324/538 |
| 5,449,414 | A | * | 9/1995 | Dolan | 148/247 |
| 5,584,946 | A | * | 12/1996 | Karmaschek et al. | 148/247 |
| 5,728,233 | A | * | 3/1998 | Ikeda et al. | 148/247 |
| 5,743,971 | A | * | 4/1998 | Inoue et al. | 148/247 |
| 5,938,861 | A | * | 8/1999 | Inoue et al. | 148/247 |
| 5,951,747 | A | * | 9/1999 | Lewis et al. | 106/14.44 |
| 6,038,309 | A | * | 3/2000 | Ram et al. | 379/229 |
| 6,059,867 | A | * | 5/2000 | Lewis et al. | 106/14.44 |
| 6,206,982 | B1 | * | 3/2001 | Hughes et al. | 148/273 |
| 6,217,674 | B1 | * | 4/2001 | Gray et al. | 148/247 |
| 6,524,401 | B2 | * | 2/2003 | Watanabe et al. | 148/238 |
| 6,994,779 | B2 | * | 2/2006 | Heimann et al. | 205/333 |

* cited by examiner

*Primary Examiner* — Anthony Green
(74) *Attorney, Agent, or Firm* — Choate, Hall & Stewart, LLP

(57) ABSTRACT

A chrome-free corrosion inhibitor composition includes: titanium chloride; a stabilizer including a mixture of hydrogen peroxide and at least a compound selected from nitric acid, persulfate, nitrate, and chlorate; and a film-forming enhancer selected from monosaccharide, oligosaccharide, polysaccharide, derivatives of saccharide, and combinations thereof.

34 Claims, 1 Drawing Sheet

CHROME-FREE CORROSION INHIBITOR COMPOSITION

CROSS-REFERENCE TO RELATED APPLICATION

This application claims priority of Taiwanese application no. 096145901, filed on Dec. 3, 2007.

BACKGROUND OF THE INVENTION

1. Field of the Invention

This invention relates to a chrome-free corrosion inhibitor composition, more particularly to a chrome-free corrosion inhibitor composition including a film-forming enhancer.

2. Description of the Related Art

A metal substrate usually has a protective coating thereon for providing corrosion resistance and for providing a shiny appearance to enhance for commercial appeal.

Conventional protective coatings have a composition including hexavalent chrome ion and have advantages of excellent corrosion resistance, self-repairability, shiny appearance, and low cost. However, hexavalent chrome is toxic and hazardous. Therefore, its use is restricted based on the Restriction of Hazardous Substance (RoHS) Directive, which is adopted by the European union and which restricts the use of specific hazardous materials in electronic and electrical products.

Moreover, since trivalent chrome can be converted into hexavalent chrome, potential hazards resulting from the use of trivalent chrome cannot be neglected. Therefore, there is a need to find a chrome-free corrosion inhibitor composition to replace the chrome-containing corrosion inhibitor composition.

Although conventional chrome-free corrosion inhibitor compositions, such as those disclosed in U.S. Pat. Nos. 5,380,374, 6,038,309, 6,059,867, 5,951,747, 5,728,233, 5,584,946, and 6,206,982, can provide corrosion resistance to metal substrates, they fail to maintain the shiny appearance provided by a decorative plating layer, such as Zn or Zn alloy, on the metal substrate.

U.S. Pat. Nos. 6,217,674, 5,449,414, and 5,432,456 disclose chrome-free corrosion inhibitor compositions that can provide corrosion resistance to a metal substrate. However, use of these compositions results in a protective film having a non-uniform appearance on the metal substrate.

U.S. Pat. Nos. 5,938,861 and 5,743,971 disclose chrome-free corrosion inhibitor compositions containing silicon compounds. These compositions are relatively unstable and can generate undesired silicate and silica precipitates when stored for a period of time.

U.S. Pat. No. 6,524,401 B1 discloses a chrome-free composition including titanium trichloride, an oxidant, such as organic acids, a complexing agent, and a metal compound. In use, the chrome-free composition is formed into a solution for application to a metal substrate. The solution is subsequently dried to form a protective coating on the metal substrate. During drying, titanium chloride is formed into titanate deposit deposited on the metal substrate to form the protective coating. The conventional chrome-free composition is disadvantageous in that the corrosion resistance, the compactness, the shiny appearance, and the uniformity of the protective coating formed therefrom still need to be improved. In addition, titanium trichloride is relatively expensive and unstable, i.e., it tends to form precipitates during storage. Moreover, the applicants conducted experiments and found that addition of the organic acids in the corrosion inhibitor composition improved insignificantly the corrosion resistance, the compactness, and the ability to maintain a shiny appearance for the protective coating formed therefrom.

Therefore, there is a need to provide a corrosion inhibitor composition that is low cost and environmental friendly, and that can provide excellent corrosion resistance, the ability to maintain a shiny appearance, and uniform appearance for the protective coating formed therefrom.

SUMMARY OF THE INVENTION

An objective of the present invention is to provide a chrome-free corrosion inhibitor composition that can overcome the above drawbacks associated with the prior art.

Another objective of this invention is to provide a method for forming a protective coating of the chrome-free corrosion inhibitor composition on a metal substrate.

According to one aspect of the present invention, there is provided a chrome-free corrosion inhibitor composition that comprises: titanium chloride; a stabilizer including a mixture of hydrogen peroxide and at least a compound selected from the group consisting of nitric acid, persulfate, nitrate, and chlorate; and a film-forming enhancer selected from the group consisting of monosaccharide, oligosaccharide, polysaccharide, derivatives of saccharide, and combinations thereof.

According to another aspect of this invention, there is provided a method for forming a protective coating on a metal substrate. The method comprises:

(a) applying a chrome-free corrosion inhibitor composition on the metal substrate, the chrome-free corrosion inhibitor composition comprising: titanium chloride; a stabilizer including a mixture of hydrogen peroxide and at least a compound selected from the group consisting of nitric acid, persulfate, nitrate, and chlorate, and a film-forming enhancer selected from the group consisting of monosaccharides, oligosaccharides, polysaccharides, derivatives of saccharide, and combinations thereof; and (b) baking the chrome-free corrosion inhibitor composition on the metal substrate so as to form the protective coating on the metal substrate.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION

Figure 1:
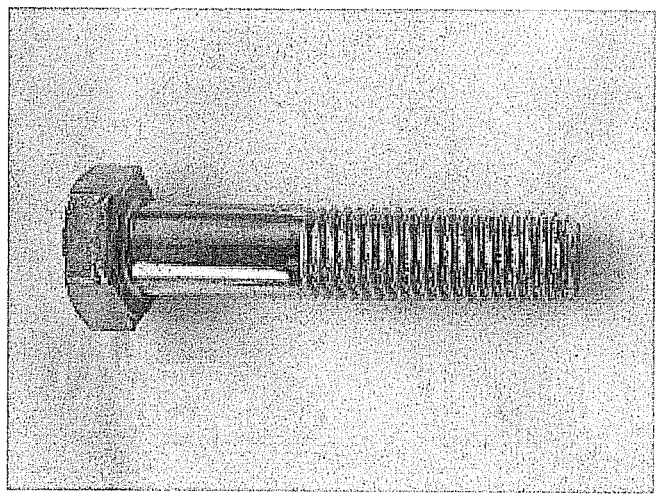
FIG. 1 is an image illustrating an appearance of Example 1 according to this invention.

This invention relates to a chrome-free corrosion inhibitor composition suitable for forming protective coatings on metal substrates of articles, such as screws, fasteners, and components of a vehicle.

The chrome-free corrosion inhibitor composition includes: titanium chloride; a stabilizer including a mixture of hydrogen peroxide and at least a compound selected from the group consisting of nitric acid, persulfate, nitrate, and chlorate; and a film-forming enhancer selected from the group consisting of monosaccharide, oligosaccharide, polysaccharide, derivatives of saccharide, and combinations thereof.

It is noted that the applicants discovered that addition of the saccharide and derivatives of saccharide materials into the chrome-free corrosion inhibitor composition can result in a more compact and dense deposition of the titanate deposit on a metal substrate and a more uniform appearance when the chrome-free corrosion inhibitor composition is applied to and is subsequently dried on the metal substrate. Since the titanate deposit thus formed is compact and dense, it can prevent penetration of air and water therethrough, thereby enhancing corrosion resistance of the metal substrate. Moreover, the film-forming enhancer can maintain the shiny appearance of the protective coating formed from the corrosion inhibitor composition. Note that the color of the shiny appearance of the protective coating depends on additives in the corrosion inhibitor composition.

In some embodiments, the persulfate is selected from the group consisting of sodium persulfate, ammonium persulfate, and combinations thereof. The nitrate is selected from the group consisting of ammonium nitrate, nitrate of alkaline metal, nitrate of alkaline earth metal, and combinations thereof. The chlorate is selected from the group consisting of ammonium chlorate, chlorate of alkaline metal, chlorate of alkaline earth metal, and combinations thereof.

In some embodiments, the nitrate is selected from the group consisting of ammonium nitrate and sodium nitrate. The persulfate is selected from the group consisting of sodium persulfate and ammonium persulfate.

In some embodiments, the monosaccharide is selected from the group consisting of glucose, heptaglucose, fructose, galactose, xylose, ribose, mannose, and combinations thereof. The oligosaccharide is selected from the group consisting of lactose, sucrose, maltose, raffinose, fucose, and combinations thereof. The polysaccharide is selected from the group consisting of arabian gum, glycogen, soluble starch, cellulose, mucopolysaccharides, hemicellulose, chitin, stachyose, inulin, dextrin, and combinations thereof.

The derivatives of saccharide are selected from the group consisting of gluconate, sugar ester, amino-sugar, and combinations thereof.

In some embodiments, the monosaccharide is selected from the group consisting of glucose, heptaglucose, and xylose. The oligosaccharide is selected from the group consisting of lactose and sucrose. The polysaccharide is selected from the group consisting of soluble starch and dextrin.

In some embodiments, the gluconate is selected from the group consisting of sodium gluconate, sodium heptagluconate, and combinations thereof. The sugar ester is sucrose benzoate. The amino-sugar is selected from the group consisting of glucosamine, N-acetyl-glucosamine, and combinations thereof.

In this embodiment, the titanium chloride is selected from the group of $TiCl_4$ and $TiCl_3$.

In another embodiment, the chrome-free corrosion inhibitor composition can further include a base agent selected from the group consisting of ammonium, metal oxide, metal hydroxide, amines, and combinations thereof.

In some embodiments, the metal oxide is selected from the group consisting of MgO, CaO, and combinations thereof. The metal hydroxide is selected from the group consisting of NaOH, KOH, $Mg(OH)_2$, $Ca(OH)_2$, $Al(OH)_3$, and combinations thereof. The amine is selected from the group consisting of ethanolamine, triethanolamine, and combinations thereof.

In this embodiment, the base agent is one of ammonium, NaOH, MgO, $Al(OH)_3$, ethanolamine, and triethanolamine.

In addition, the chrome-free corrosion inhibitor composition can further include a sulfur-containing material selected from the group consisting of $Na_2S_2O_3$, $(NH_3)_2S_2O_3$, thiourea, $Na_2S$, and combinations thereof, so as to enhance adhesion between the metal substrate and the deposition made from the chrome-free corrosion inhibitor composition.

In this embodiment, the sulfur-containing material is one of $Na_2S_2O_3$, thiourea, and $Na_2S$.

In this embodiment, the chrome-free corrosion inhibitor composition further includes a polar solvent so as to disperse other components therein and so as to form the chrome-free corrosion inhibitor composition into a solution.

In some embodiments, the polar solvent is selected from the group consisting of water, ethanol, n-propyl alcohol, and combinations thereof. In this embodiment, the polar solvent is water.

In order to avoid undesired reactions, in some embodiments, the chrome-free corrosion inhibitor composition has a pH value ranging from 0.5 to 3.0, more preferably, ranging from 1.0 to 2.0.

In some embodiments, the titanium chloride is in an amount ranging from 0.1 g/L (i.e., 0.1 gram per liter of the chrome-free corrosion inhibitor composition) to 100 g/L, more preferably, ranging from 0.1 g/L to 50 g/L, most preferably, ranging from 3 g/L to 30 g/L. In this embodiment, the titanium chloride is in an amount ranging from 5 g/L to 20 g/L.

In some embodiments, the stabilizer is in an amount ranging from 0.1 g/L (i.e., 0.1 gram per liter of the chrome-free corrosion inhibitor composition) to 100 g/L, more preferably, ranging from 0.1 g/L to 50 g/L, most preferably, ranging from 3 g/L to 25 g/L. In this embodiment, the stabilizer is in an amount ranging from 3.75 g/L to 13.8 g/L.

In some embodiments, the hydrogen peroxide is in an amount ranging from 0.02 g/L (i.e., 0.02 gram per liter of the chrome-free corrosion inhibitor composition) to 33 g/L, more preferably, ranging from 0.02 g/L to 16 g/L, most preferably, ranging from 0.6 g/L to 10.5 g/L. In this embodiment, the hydrogen peroxide is in an amount ranging from 1.75 g/L to 7 g/L.

In some embodiments, the film-forming enhancer is in an amount ranging from 0.1 g/L (i.e., 0.1 gram per liter of the chrome-free corrosion inhibitor composition) to 100 g/L, more preferably, ranging from 0.1 g/L to 40 g/L. In this embodiment, the film-forming enhancer is in an amount ranging from 0.44 g/L to 20 g/L.

In some embodiments, the base agent is in an amount less than 20 grams per liter of the chrome-free corrosion inhibitor composition, more preferably, ranging from 0.05 g/L to 8 g/L. In this embodiment, the base agent is in an amount ranging from 0.56 g/L to 5 g/L.

In some embodiments, the sulfur-containing material is in an amount less than 50 grams per liter of the chrome-free corrosion inhibitor composition, more preferably, ranging from 0.1 g/L to 15 g/L. In this embodiment, the sulfur-containing material is in an amount ranging from 0.5 g/L to 6.37 g/L.

This invention also provides a method for forming a protective coating on a metal substrate. The method includes the steps of: (a) applying the chrome-free corrosion inhibitor composition on the metal substrate; and (b) baking the chrome-free corrosion inhibitor composition on the metal substrate so as to form the protective coating on the metal substrate.

This invention also provides a metal article that includes: a metal substrate; and a protective coating coated on the metal substrate and made from the chrome-free corrosion inhibitor composition.

In some embodiments, the metal substrate has a surface made from a material selected from the group consisting of Zn, Al, Al—Zn alloy, Al alloy, and combinations thereof.

To form the protective coating on the metal substrate, the metal substrate is immersed in a solution of the chrome-free corrosion inhibitor composition, followed by drying the solution applied on the metal substrate.

The merits of the chrome-free corrosion inhibitor composition of this invention will become apparent with reference to the following Examples and Comparative Example.

Example

Chemicals Used for Examples 1-23 (E1-23) and Comparative Example 1 (CE1)

(1) $TiCl_4$: industrial grade, 99.9%.
(2) $H_2O_2$ (aq): industrial grade, 35%.
(3) $HNO_3$: industrial grade, 68%.
(4) glucose: reagent grade, 99.5%.
(5) glucosamine: reagent grade, 98%
(6) sodium gluconate: reagent grade, 98%.
(7) soluble starch: reagent grade, 99%.
(8) dextrin: reagent grade, 98%.
(9) xylose: reagent grade, 99%.
(10) N-acetyl-glucosamine: reagent grade, 95%.
(11) lactose: reagent grade, 88%.
(12) sucrose: food grade, 98%.
(13) sucrose benzoate: reagent grade, 98%.
(14) MgO: industrial grade, 99%.
(15) $NH_3$: industrial grade, 28%.
(16) $Al(OH)_3$: reagent grade, 76.5%.
(17) NaOH: reagent grade, 98%.
(18) ethanolamine (EA): industrial grade, 98%.
(19) triethanolamine (TEA): reagent grade, 98%.
(20) thiourea: reagent grade, 95%.
(21) $Na_2S$: industrial grade, 60%.
(22) $Na_2S_2O_3 \cdot 5H_2O$: reagent grade, 99.5%.

Testing Method

Storage test: The chrome-free corrosion inhibitor composition was prepared and then stored in a dark environment for a period of time. The time when a precipitation was observed was recorded.

NSST test: A metal article having a protective coating made from the chrome-free corrosion inhibitor composition was tested based on ASTM B-117. When a corrosive area occupied 5% of the total area of the protective coating, a 'corrosion resistance time' was recorded. In practice, a 48 hr of corrosion resistance time is acceptable.

Preparing the Chrome-Free Corrosion Inhibitor Composition

The chrome-free corrosion inhibitor compositions of Examples 1-23 and Comparative Example 1 were prepared by the same following steps, except that the components used and/or the amounts of the components used in the chrome-free corrosion inhibitor compositions were different.

The components of the chrome-free corrosion inhibitor composition were mixed under room temperature, stirred, followed by adjusting of the concentration with water so as to obtain a solution of the chrome-free corrosion inhibitor composition.

A Zn-coating screw was rinsed with diluted nitric acid, and immersed in the solution of the chrome-free corrosion inhibitor composition for 15 sec. Subsequently, the Zn-coating screw was rinsed with water and dried in an oven under a temperature of 150° C. so as to form a protective coating on the Zn-coating screw.

Table 1 shows the content of each of the components of the chrome-free corrosion inhibitor composition and test results of Examples 1-23 and Comparative Example 1.

TABLE 1

| | $TiCl_4$ (g/L) | Stabilizer | | Film-forming enhancer | | Base agent | | Sulfide | | pH | | NSST |
| | | $H_2O_2$ (g/L) | $HNO_3$ (g/L) | component | g/L | component | g/L | component | g/L | value | appearance | (hr) |
|---|---|---|---|---|---|---|---|---|---|---|---|---|
| E1 | 20 | 7 | 3.4 | glucose | 3 | MgO | 3 | Thiourea | 2 | 1.1 | iridescent | >96 |
| E2 | 10 | 5.25 | 2.04 | glucosamine | 5 | — | — | $Na_2S_2O_3$ | 1.27 | 1.5 | light-iridescent | >96 |
| E3 | 10 | 5.25 | 3.4 | sodium gluconate | 3 | MgO | 2 | $Na_2S_2O_3$ | 6.37 | 1.7 | iridescent | >96 |
| E4 | 10 | 5.25 | 3.4 | soluble starch | 2 | MgO | 3 | $Na_2S_2O_3$ | 6.37 | 1.7 | iridescent | >96 |
| E5 | 12 | 5.25 | 2.04 | dextrin | 5 | — | — | $Na_2S_2O_3$ | 1.27 | 1.1 | light-iridescent | >96 |
| E6 | 12 | 5.25 | 2.04 | sodium gluconate | 2 | NH3 | 0.56 | $Na_2S_2O_3$ | 1.53 | 1.3 | iridescent | >96 |
| E7 | 12 | 5.25 | 2.04 | sylose | 5 | NH3 | 0.56 | $Na_2S_2O_3$ | 1.53 | 1.2 | light-iridescent | >96 |
| E8 | 10 | 5.25 | 3.4 | glucose | 3 | $Al(OH)_3$ | 1.53 | — | — | 1.1 | light-iridescent | >72 |
| E9 | 8 | 4.2 | 2.04 | N-acetyl-glucosamine | 2 | — | — | — | — | 1.4 | light-iridescent | >72 |
| E10 | 10 | 5.25 | 3.4 | sodium gluconate | 3 | MgO | 1 | — | — | 1.2 | light-iridescent | >72 |
| E11 | 10 | 5.25 | 2.04 | glucosamine | 5 | — | — | — | — | 1.2 | light-iridescent | >72 |
| E12 | 5 | 3.5 | 2 | glucose | 1 | — | — | Thiourea | 0.5 | 1.6 | light-iridescent | >72 |
| E13 | 12 | 5.25 | 2.04 | glucose | 3 | — | — | $Na_2S$ | 1.8 | 1.2 | light-iridescent | >72 |
| E14 | 8 | 4.2 | 2.04 | lactose | 1.76 | — | — | $Na_2S_2O_3$ | 3.19 | 1.4 | light-iridescent | >72 |
| E15 | 8 | 4.2 | 2.04 | lactose | 4.4 | — | — | $Na_2S_2O_3$ | 1.27 | 1.4 | light-iridescent | >72 |

TABLE 1-continued

| | TiCl₄ (g/L) | Stabilizer H₂O₂ (g/L) | HNO₃ (g/L) | Film-forming enhancer component | g/L | Base agent component | g/L | Sulfide component | g/L | pH value | appearance | NSST (hr) |
|---|---|---|---|---|---|---|---|---|---|---|---|---|
| E16 | 10 | 5.25 | 3.4 | sucrose | 20 | NH₃ | 0.56 | Na₂S₂O₃ | 1.27 | 1.6 | light-iridescent | >72 |
| E17 | 5 | 3.5 | 2 | sucrose benzoate | 1 | — | — | Thiourea | 0.5 | 1.6 | light-iridescent | >72 |
| E18 | 6 | 7 | 2 | sucrose | 4 | — | — | Na₂S₂O₃ | 1.27 | 1.4 | colorless | >72 |
| E19 | 5 | 1.75 | 2 | glucose | 1 | — | — | — | — | 1.6 | colorless | >48 |
| E20 | 5 | 5.25 | 3.4 | sucrose | 2 | NaOH | 5 | — | — | 1.8 | light-iridescent | ~48 |
| E21 | 8 | 4.2 | 2.04 | lactose | 0.44 | — | — | Na₂S₂O₃ | 3.19 | 1.4 | light-iridescent | ~48 |
| E22 | 5 | 3.5 | 2.04 | sucrose | 2 | EA | 1 | — | — | 1.5 | light-iridescent | ~48 |
| E23 | 15 | 7 | 6.8 | glucose | 3 | TEA | 5 | — | — | 1.3 | colorless | ~48 |
| CE1 | 8 | 4.2 | 2.04 | — | — | MgO | 2 | — | — | 1.4 | light-iridescent | ~24 | where "—" means not added

Figure 2:
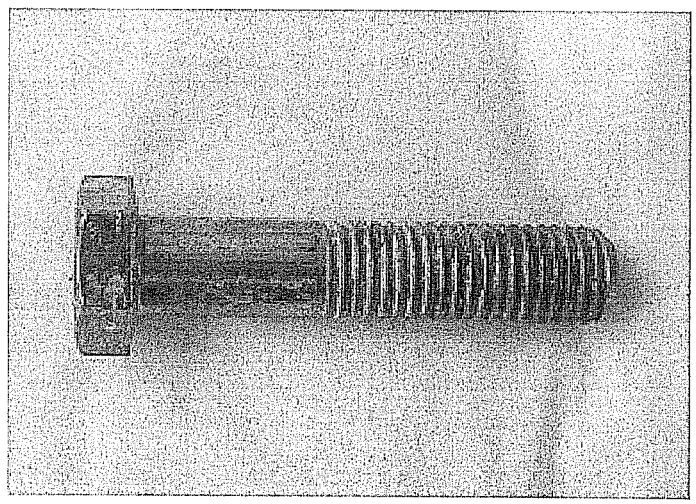
FIG. 2 is an image illustrating the appearance of Example 1 after the NSST test of 120 hr.

FIG. 1 is an image showing the appearance of the Zn-coating screw of Example 1, which has an iridescent appearance. FIG. 2 is an image showing the appearance of the Zn-coating screw of Example 1 after the NSST test of 120 hr.

The results show that each of the Examples 1-23 has a longer corrosion resistance time (NSST test) than that of Comparative Example 1 (without the film-forming enhancer), which indicates that the film-forming enhancer can improve considerably the density of the titanate deposit formed on the metal substrate, thereby enhancing the corrosion resistance and iridescent appearance of the protective coating.

With the inclusion of the film-forming enhancer in the chrome-free corrosion inhibitor composition of this invention, the aforesaid drawbacks associated with the prior art can be eliminated.

With the invention thus explained, it is apparent that various modifications and variations can be made without departing from the spirit of the present invention. It is therefore intended that the invention be limited only as recited in the appended claims.

What is claimed is:

1. A chrome-free corrosion inhibitor composition comprising:
   titanium chloride;
   a stabilizer including a mixture of hydrogen peroxide and at least a compound selected from the group consisting of nitric acid, persulfate, nitrate, and chlorate; and
   a film-forming enhancer selected from the group consisting of monosaccharide, oligosaccharide, polysaccharide, derivatives of saccharide, and combinations thereof.

2. The chrome-free corrosion inhibitor composition of claim 1, wherein said persulfate is selected from the group consisting of sodium persulfate, ammonium persulfate, and combinations thereof; said nitrate being selected from the group consisting of ammonium nitrate, nitrate of alkaline metal, nitrate of alkaline earth metal, and combinations thereof; said chlorate being selected from the group consisting of ammonium chlorate, chlorate of alkaline metal, chlorate of alkaline earth metal, and combinations thereof.

3. The chrome-free corrosion inhibitor composition of claim 2, wherein said nitrate is selected from the group consisting of ammonium nitrate and sodium nitrate; said persulfate being selected from the group consisting of sodium persulfate and ammonium persulfate.

4. The chrome-free corrosion inhibitor composition of claim 1, wherein said monosaccharide is selected from the group consisting of glucose, heptaglucose, fructose, galactose, xylose, ribose, mannose, and combinations thereof; said oligosaccharide being selected from the group consisting of lactose, sucrose, maltose, raffinose, fucose, and combinations thereof; said polysaccharide being selected from the group consisting of arabian gum, glycogen, soluble starch, cellulose, mucopolysaccharides, hemicellulose, chitin, stachyose, inulin, dextrin, and combinations thereof; said derivatives of saccharide being selected from the group consisting of gluconate, sugar ester, amino-sugar, and combinations thereof.

5. The chrome-free corrosion inhibitor composition of claim 4, wherein said monosaccharide is selected from the group consisting of glucose, heptaglucose, and xylose; said oligosaccharide being selected from the group consisting of lactose and sucrose; said polysaccharide being selected from the group consisting of soluble starch and dextrin.

6. The chrome-free corrosion inhibitor composition of claim 4, wherein said gluconate is selected from the group consisting of sodium gluconate, sodium heptagluconate, and combinations thereof; said sugar ester being sucrose benzoate; said amino-sugar being selected from the group consisting of glucosamine, N-acetyl-glucosamine, and combinations thereof.

7. The chrome-free corrosion inhibitor composition of claim 1, wherein said titanium chloride is selected from the group consisting of TiCl₄ and TiCl₃.

8. The chrome-free corrosion inhibitor composition of claim 1, further comprising a base agent selected from the group consisting of ammonium, metal oxide, metal hydroxide, amine, and combinations thereof.

9. The chrome-free corrosion inhibitor composition of claim 8, wherein said metal oxide is selected from the group consisting of MgO, CaO, and combinations thereof; said metal hydroxide being selected from the group consisting of NaOH, KOH, Mg(OH)₂, Ca(OH)₂, Al(OH)₃, and combinations thereof; said amine being selected from the group consisting of ethanolamine, triethanolamine, and combinations thereof.

10. The chrome-free corrosion inhibitor composition of claim 1, further comprising a sulfur-containing material.

11. The chrome-free corrosion inhibitor composition of claim 10, wherein said sulfur-containing material is selected from the group consisting of $Na_2S_2O_3$, thiourea, $Na_2S$, and combinations thereof.

12. The chrome-free corrosion inhibitor composition of claim 1, wherein said chrome-free corrosion inhibitor composition has a pH value ranging from 0.5 to 3.0.

13. The chrome-free corrosion inhibitor composition of claim 12, wherein said chrome-free corrosion inhibitor composition has a pH value ranging from 1.0 to 2.0.

14. The chrome-free corrosion inhibitor composition of claim 1, wherein said titanium chloride is in an amount ranging from 0.1 g to 100 g per liter of said chrome-free corrosion inhibitor composition.

15. The chrome-free corrosion inhibitor composition of claim 14, wherein said titanium chloride is in an amount ranging from 0.1 g to 50 g per liter of said chrome-free corrosion inhibitor composition.

16. The chrome-free corrosion inhibitor composition of claim 15, wherein said titanium chloride is in an amount ranging from 3 g to 30 g per liter of said chrome-free corrosion inhibitor composition.

17. The chrome-free corrosion inhibitor composition of claim 1, wherein said stabilizer is in an amount ranging from 0.1 g to 100 g per liter of said chrome-free corrosion inhibitor composition.

18. The chrome-free corrosion inhibitor composition of claim 17, wherein said stabilizer is in an amount ranging from 0.1 g to 50 g per liter of said chrome-free corrosion inhibitor composition.

19. The chrome-free corrosion inhibitor composition of claim 18, wherein said stabilizer is in an amount ranging from 3 g to 25 g per liter of said chrome-free corrosion inhibitor composition.

20. The chrome-free corrosion inhibitor composition of claim 1, wherein said hydrogen peroxide is in an amount ranging from 0.02 g to 33 g per liter of said chrome-free corrosion inhibitor composition.

21. The chrome-free corrosion inhibitor composition of claim 20, wherein said hydrogen peroxide is in an amount ranging from 0.02 g to 16 g per liter of said chrome-free corrosion inhibitor composition.

22. The chrome-free corrosion inhibitor composition of claim 21, wherein said hydrogen peroxide is in an amount ranging from 0.6 g to 10.5 g per liter of said chrome-free corrosion inhibitor composition.

23. The chrome-free corrosion inhibitor composition of claim 1, wherein said film-forming enhancer is in an amount ranging from 0.1 g to 100 g per liter of said chrome-free corrosion inhibitor composition.

24. The chrome-free corrosion inhibitor composition of claim 23, wherein said film-forming enhancer is in an amount ranging from 1 g to 40 g per liter of said chrome-free corrosion inhibitor composition.

25. The chrome-free corrosion inhibitor composition of claim 8, wherein said base agent is in an amount less than 20 g per liter of said chrome-free corrosion inhibitor composition.

26. The chrome-free corrosion inhibitor composition of claim 25, wherein said base agent is in an amount ranging from 0.05 g to 8 g per liter of said chrome-free corrosion inhibitor composition.

27. The chrome-free corrosion inhibitor composition of claim 10, wherein said sulfur-containing material is in an amount less than 50 g per liter of said chrome-free corrosion inhibitor composition.

28. The chrome-free corrosion inhibitor composition 10 of claim 27, wherein said sulfur-containing material is in an amount ranging from 0.1 g to 15 g per liter of said chrome-free corrosion inhibitor composition.

29. The chrome-free corrosion inhibitor composition of claim 1, further comprising a polar solvent.

30. The chrome-free corrosion inhibitor composition of claim 29, wherein said polar solvent is selected from the group consisting of water, ethanol, n-propyl alcohol, and combinations thereof.

31. A metal article comprising:
   a metal substrate; and
   a protective coating coated on said metal substrate and made from a chrome-free corrosion inhibitor composition that includes: titanium chloride; a stabilizer including a mixture of hydrogen peroxide and at least a compound selected from the group consisting of nitric acid, persulfate, nitrate, and chlorate; and a film-forming enhancer selected from the group consisting of monosaccharide, oligosaccharide, polysaccharide, derivatives of saccharide, and combinations thereof.

32. The metal article of claim 31, wherein said metal substrate has a surface made from a material selected from the group consisting of Zn, Al, Al—Zn alloy, Al alloy, and combinations thereof.

33. The metal article of claim 31, wherein said titanium chloride is selected from the group consisting of $TiCl_4$ and $TiCl_3$.

34. A method for forming a protective coating on a metal substrate, comprising:
   (a) applying a chrome-free corrosion inhibitor composition on the metal substrate, the chrome-free corrosion inhibitor composition comprising: titanium chloride; a stabilizer including a mixture of hydrogen peroxide and at least a compound selected from the group consisting of nitric acid, persulfate, nitrate, and chlorate; and a film-forming enhancer selected from the group consisting of monosaccharide, oligosaccharide, polysaccharide, derivatives of saccharide, and combinations thereof; and
   (b) baking the chrome-free corrosion inhibitor composition on the metal substrate so as to form the protective coating on the metal substrate.

* * * * *